United States Patent
Benson et al.

(10) Patent No.: US 6,726,870 B1
(45) Date of Patent: Apr. 27, 2004

(54) METHOD FOR MAKING A BULKED WEB

(75) Inventors: Douglas Herrin Benson, West Harrison, IN (US); John Joseph Curro, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/600,405

(22) PCT Filed: Jan. 23, 1998

(86) PCT No.: PCT/US98/00929
§ 371 (c)(1),
(2), (4) Date: Jul. 17, 2000

(87) PCT Pub. No.: WO99/37842
PCT Pub. Date: Jul. 29, 1999

(51) Int. Cl.[7] .................. B29C 59/04; B29C 55/08; B29C 53/26
(52) U.S. Cl. .............. 264/284; 264/283; 264/287; 264/288.4; 264/290.2; 156/62.4; 156/62.8; 156/181; 156/209; 156/229; 156/245; 156/296
(58) Field of Search .................. 264/283, 284, 264/287, 288.4, 290.2; 156/62.4, 62.8, 181, 209, 229, 245, 296

(56) References Cited

U.S. PATENT DOCUMENTS

| | | | |
|---|---|---|---|
| 4,189,344 A | * 2/1980 | Busker | 162/117 |
| 4,236,963 A | 12/1980 | Busker | 162/271 |
| 4,913,911 A | * 4/1990 | Wildt | 156/209 |
| 4,919,877 A | * 4/1990 | Parsons et al. | 156/183 |
| 4,965,122 A | * 10/1990 | Morman | 428/326 |
| 5,226,992 A | 7/1993 | Morman | 156/62.4 |
| 5,244,482 A | * 9/1993 | Hassenboehler et al. | 55/528 |
| 5,914,084 A | * 6/1999 | Benson et al. | 156/209 |
| 6,129,801 A | * 10/2000 | Benson et al. | 156/196 |

FOREIGN PATENT DOCUMENTS

| WO | WO 97/47264 A1 | 12/1997 | |
|---|---|---|---|
| WO | WO 98/05813 A1 | 2/1998 | |
| WO | WO 98/45520 A1 | 10/1998 | |
| WO | WO-98/48091 A1 * | 10/1998 | D04H/1/54 |

OTHER PUBLICATIONS

International Search Report for PCT/US98/00929 dated Dec. 2, 1998, filed Jan. 23, 1998.

* cited by examiner

Primary Examiner—Michael Colaianni
Assistant Examiner—Michael I. Poe
(74) Attorney, Agent, or Firm—Ian S. Robinson; Edward L. Milbrada; Ken K. Patel

(57) ABSTRACT

A method for making a bulky web. A web is fed in a first direction. The web is subjected to incremental stretching in a direction perpendicular to the first direction to provide a bulky web. The bulky web is then stabilized to provide a stabilized bulked web, Optionally, the bulky web may be gathered after it has been subjected to incremental stretching.

15 Claims, 7 Drawing Sheets

METHOD FOR MAKING A BULKED WEB

FIELD OF THE INVENTION

The present invention relates to a method for making a bulked web. Bulked materials, such as bulked nonwoven webs are particularly well suited for use in disposable absorbent articles such as diapers, incontinence briefs, training pants, feminine hygiene garments, and the like, as they are able to handle fluid in a manner which improves the articles performance.

BACKGROUND OF THE INVENTION

Nonwoven webs may be manufactured into products and components of products so inexpensively that the product may be viewed as disposable after only one or a few uses. Representatives of such products include diapers, training pants, wipes, garments incontinence briefs, feminine hygiene garments and the like.

Nonwoven webs may be treated to provide the nonwoven web with certain properties. For example, U.S. Pat. No. 5,244,482 issued to Hassenboehler, Jr. et al. on Sep. 14, 1993 discloses a method for treating a nonwoven web wherein the nonwoven web is heated at an elevated temperature and uniaxially drawn to consolidate and stabilize the nonwoven web. Such nonwoven webs are noted to exhibit an increased elasticity after processing. Such elasticity increase is recognized as being caused by the new "memory" instilled by the heating of the nonwoven web. For applications desiring enhanced extensibility rather than elasticity, such heating is therefore not desirable. Additionally, such drawing and setting of the nonwoven web by heating at an elevated temperature often causes fiber embrittlement and the nonwoven web to exhibit increased gloss. For many applications involving skin contact, e.g., such as in diaper coverstock, such attributes are contrary to the desired cloth-like properties of softness and non-plastic, (low gloss) appearance. Lastly, the requirement of heating the nonwoven web to consolidate and stabilize the web adds to the complexity and cost of the process.

U.S. Pat. No. 4,981,747 issued to Morman on Jan. 1, 1991, discloses a "reversibly necked" material. It is taught that the unstabilized necked material must be held under high tension on the re-wound roll until such time as the further heat setting step is performed to stabilize the material. Such a material will again suffer the deficits noted above with respect to preferred skin contact applications, and will enhance the elastic properties of the material rather than the extensible behavior of the material.

U.S. Pat. No. 5,226,992 issued to Morman on Jul. 13, 1993, discloses a method of producing a composite elastic necked-bonded material. A tensioning force is applied to at least one neckable material, such as a neckable nonwoven web, to neck or consolidate the material. Instead of heating the consolidated nonwoven web, this patent teaches superposing the tensioned consolidated nonwoven web on an elastic material and joining the tensioned consolidated nonwoven web to the elastic material while the tensioned consolidated nonwoven web is in a tensioned condition. By joining the tensioned consolidated nonwoven web to the elastic material while still in a tensioned condition, the nonwoven web is constrained to its' necked dimension. Such a procedure does not provide a means for producing a stabilized extensible web without the attachment of the nonwoven web to an additional elastic layer.

It is also an object of the present invention to provide a post-processing method for producing a stabilized bulked web.

It is an object of the present invention to provide a stabilized bulked web, capable of being wound into stable rollstock or festooned form, suitable for subsequent conversion or combining operations.

As used herein, the term "stabilized" refers to a material of the present invention which is capable of being stored in a stable condition in any common or conventional web storage manner. Such storage means would include for example, low tension rolls or festooned material in boxes.

As used herein, the term "nonwoven web", refers to a web that has a structure of individual fibers or threads which are interlaid, but not in any regular repeating manner. Nonwoven webs have been, in the past, formed by a variety of processes such as, for example, meltblowing processes, spunbonding process, and bonded carded web processes.

As used herein, the term "polymer", generally includes, but is not limited to, homopolymers, copolymers, such as, for example, block, graft, random, and alternating copolymers, terpolymers, etc. and blends and modifications thereof. Furthermore, unless otherwise specifically limited, the term "polymer" shall include all possible molecular geometric configurations of the material. These configurations include, but are not limited to, isotactic, syndiotactic and random symmetries.

As used herein, the term "surface-pathlength" refers to a measurement along a topographic surface of the material in question in a specified direction.

SUMMARY OF THE INVENTION

In accordance with the present invention there is provided a method of producing a bulked web comprising the steps of:
providing a web;
feeding the web in a first direction;
subjecting the web to incremental stretching in a direction perpendicular to the first direction to provide a bulky web; and
stabilizing the bulky web to provide a stabilized bulked web.

The method may also comprise the additional step of gathering the bulky web after the web has been subjected to incremental stretching in a direction perpendicular to the first direction. The step of gathering the bulky web comprises feeding the web through a cross-directional web diverting device.

The method may also comprise the additional step of winding nonwoven web onto a take-up roll or festooning the nonwoven web into box.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

Figure 1:
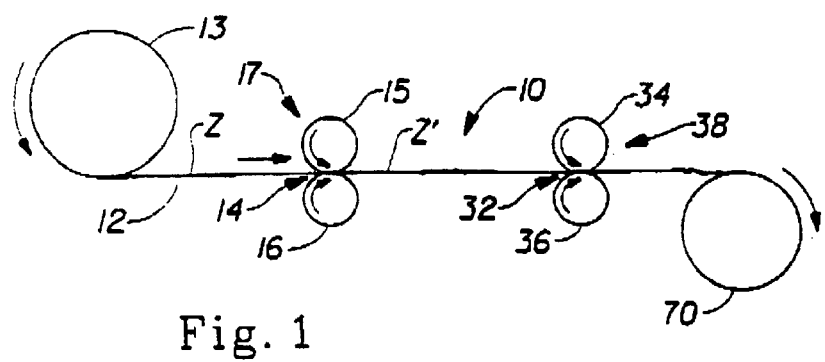
FIG. 1 is schematic illustration of an exemplary process for forming a bulked web of the present invention.

Referring to FIG. 1 there is schematically illustrated at 10 a process for forming a stabilized bulked web of the present invention.

According to the present invention, a web 12 which is preferably a nonwoven web, is unwound from a supply roll 13 and travels in the direction indicated by the arrows associated therewith, i.e., in the machine direction or MD or first direction, as the supply roll 13 rotates in the direction indicated by the arrows associated therewith. From the supply roll 13 the web 12 passes through the nip 14 formed by the incremental stretching rollers 15 and 16 of the cross-machine direction web enhancement arrangement 17.

The nonwoven web 12 may be formed by known nonwoven extrusion processes, such as, for example, known meltblowing processes or known spunbonding processes, and passed directly through the nip 14 without first being stored on a supply roll.

Figure 2:
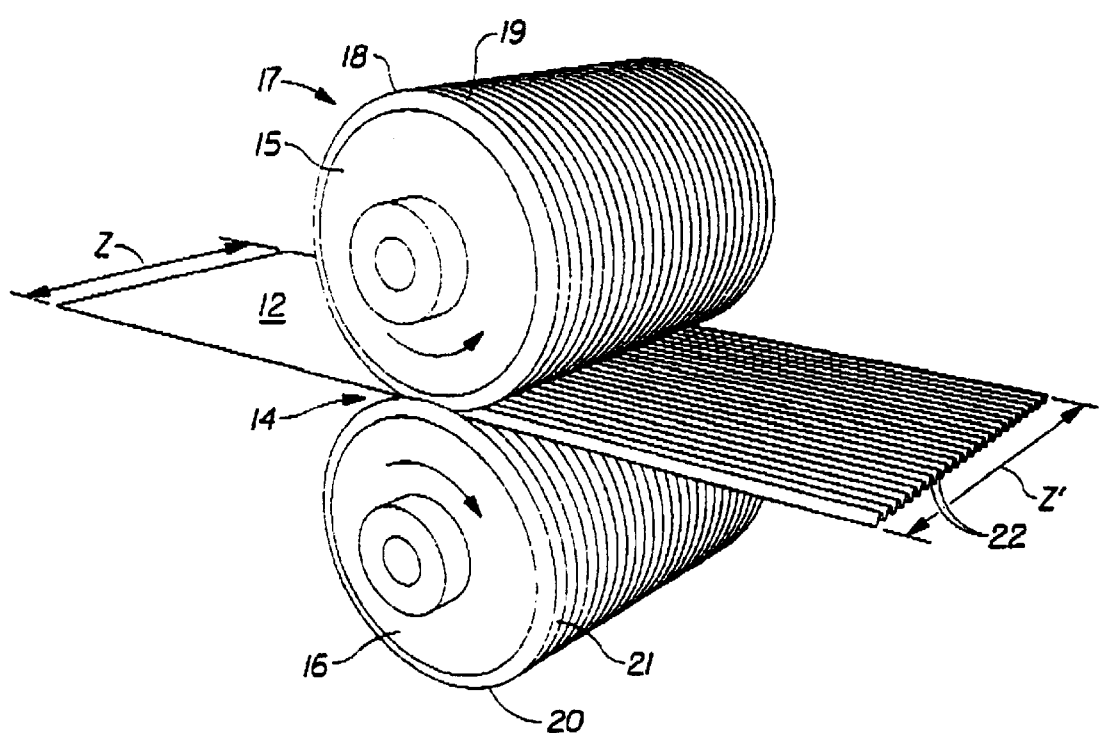
FIG. 2 is an enlarged perspective illustration of the cross-machine direction web enhancement arrangement.

FIG. 2 is an enlarged perspective illustration of a preferred embodiment of the cross-machine direction web enhancement arrangement 17 employing opposed pressure applicators having three-dimensional surfaces which at least to a degree are complimentary to one another. The cross-machine direction web enhancement arrangement 17 shown in FIG. 2 comprises incremental stretching rollers 15 and 16. The nonwoven web 12 passes through the nip 14 formed by incremental stretching rollers 15 and 16 as the incremental stretching rollers rotate in the direction indicated by the arrows associated therewith. Uppermost incremental stretching roller 15 comprises a plurality of teeth 18 and corresponding grooves 19 which extend about the entire circumference of roller 15. Lowermost incremental stretching roller 16 comprises a plurality of teeth 20 and corresponding grooves 21 which extend about the entire circumference of roller 16.

The teeth 18 on roller 15 intermesh with or engage the grooves 21 on roller 16, while the teeth 20 on roller 16 intermesh with or engage the grooves 19 on roller 15.

The teeth 18 and 20 on rollers 15 and 16, respectively, extend in a direction substantially parallel to the travel direction of the nonwoven web 12 or in a direction substantially perpendicular to the width of the nonwoven web 12. That is, teeth 18 and 20 extend in a direction parallel to the machine, MD or first direction. The incremental stretching rollers 15 and 16 incrementally stretch the nonwoven web in a direction generally perpendicular to the first or machine direction thereby causing the fibers of the nonwoven web to be oriented, at least to a degree, in the cross-machine or CD direction or perpendicular to the first direction. In addition to orienting the individual fibers of the nonwoven web in CD direction the surface-pathlength of the nonwoven web as measured in the CD direction or perpendicular to the first direction increases. As the nonwoven web 12 exits the cross-machine direction web enhancement arrangement 17 the nonwoven web 12 includes a plurality of rugosities 22. The rugosities 22 provide the nonwoven web 12 with its increased surface-pathlength as compared to the surface-pathlength of the substantially flat nonwoven web 12 prior to entering the cross-machine direction web enhancement arrangement 17. While the rugosities 22 provide the web 12 with its increased surface-pathlength, the overall width of the web is not increased, accordingly the web 12 has an increased bulk.

Figure 3:
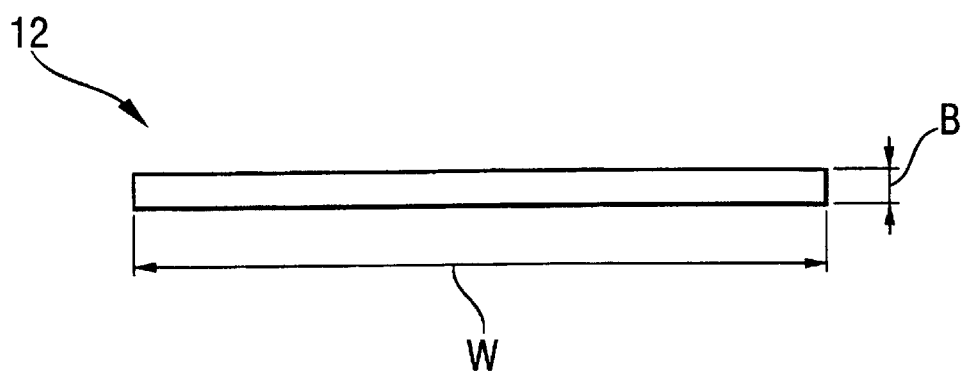
FIG. 3 is an illustration of a web prior to entering the cross-machine direction web enhancement arrangement.
Figure 4:
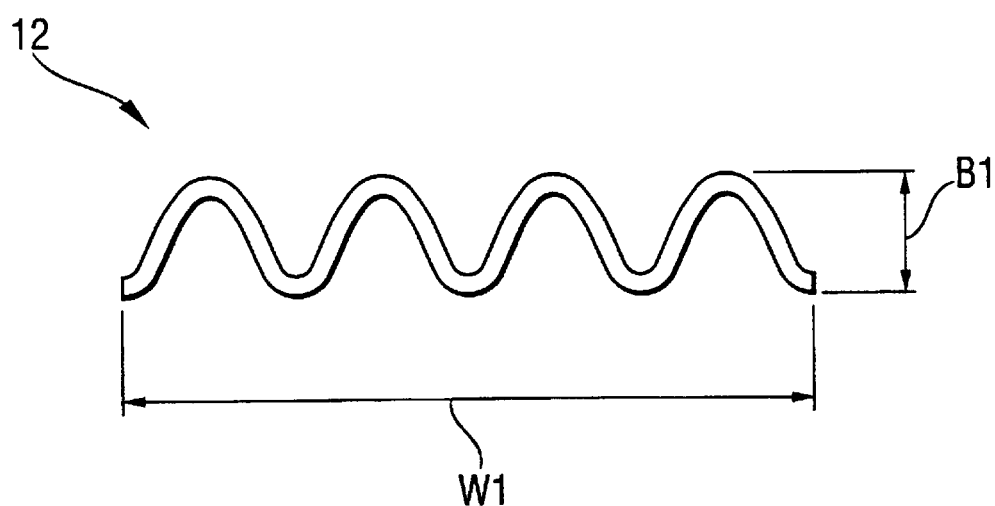
FIG. 4 is an illustration of a web which has been subjected to the cross-machine direction web enhancement arrangement.

In FIG. 3 there is illustrated a web 12 prior to entering the cross-machine direction web enhancement arrangement 17. Prior to entering the cross-machine direction web enhancement arrangement 17 the web 12 has a bulk dimension B and a width dimension W. In FIG. 4 there is illustrated a web 12 which has been subjected to the cross-machine direction web enhancement arrangement 17. After being subjected to the cross-machine direction web enhancement arrangement 17 the web 12 has a new bulk dimension B1 and a width dimension W1. Bulk dimension B1 is greater than bulk dimension B while width dimensions W and W1 remain generally the same. Bulk dimension B1 is preferably at least about 10% greater than bulk dimension B, more preferably at least about 20% greater than bulk dimension B, and most preferably at least about 30% greater than bulk dimension B. Bulk dimension B1 may be as much as about 200% greater than dimension B.

As can be seen in FIG. 2, prior to entering the nip 14 of the cross-machine direction web enhancement arrangement 17, the nonwoven web 12 has a CD surface-pathlength dimension Z. After being subjected to the incremental stretching rollers 15 and 16 the nonwoven web has a plurality of rugosities 22 which provide the nonwoven web 12 with a new CD surface-pathlength dimension Z' which is greater than CD surface-pathlength dimension Z. The web 12 has generally the same width dimension prior to entering, W, and upon exiting, W1, the cross-machine direction web enhancement arrangement 17. Because the width of the web 12 remains unchanged but the CD surface-pathlength dimension increases due to the presence of rugosities 22 upon exiting the cross-machine direction web enhancement arrangement 17 the web 12 has an increased bulk B1 as shown in FIG. 4.

CD surface-pathlength dimension Z' is preferably at least about 10% greater than CD surface-pathlength dimension Z, more preferably at least about 20% greater than CD surface-pathlength dimension Z, and most preferably at least about 30% greater than CD surface-pathlength dimension Z. CD surface-pathlength dimension Z' may be as much as about 200% greater than dimension Z or more without subjecting the nonwoven web to catastrophic failure. For example, the nonwoven web 12 having a CD surface-pathlength dimension Z of 10 inches, may be expanded 50% to have a CD surface-pathlength dimension Z' of 15 inches.

The method for determining the surface-pathlength of the nonwoven web can be found in the Test Methods section set forth in subsequent portions of the present specification.

The incremental stretching rollers 15 and 16 may include any number of teeth and grooves as desired. In addition, the teeth and grooves may be nonlinear, such as for example, curved, sinusoidal, zig-zag, etc. The size and amount of engagement of teeth and grooves on incremental stretching rollers 15 and 16 may be of any desired dimension.

From the cross-machine direction web enhancement arrangement 17 the bulky nonwoven web 12 is stabilized or set. The bulky nonwoven web 12 may be stabilized mechanically, chemically, thermally, or by other techniques known in the art. The process illustrated in FIG. 1 shows the bulky nonwoven web being subjected to mechanical stabilization via the mechanical stabilization arrangement 38. In order to provide chemical stabilization, the mechanical stabilization arrangement 38 is replaced with an apparatus, such as a spray head, to apply a chemical agent to the nonwoven web 12. Any conventional equipment known in the art for applying chemical agents to moving webs may be used. In order to provide thermal stabilization, the mechanical stabilization arrangement 38 is replaced with an apparatus, such as an oven, to apply a heat the nonwoven web 12. Any conventional equipment known in the art for heating moving webs may be used.

The nonwoven web 12 may be extensible, elastic, or nonelastic nonwoven material. The nonwoven web 12 may be a spunbonded web, a meltblown web, or a bonded carded web. If the nonwoven web is a web of meltblown fibers, it may include meltblown microfibers. The nonwoven web 12 may be made of fiber forming polymers such as, for example, polyolefins. Exemplary polyolefins include one or more of polypropylene, polyethylene, ethylene copolymers, propylene copolymers, and butene copolymers.

In one embodiment of the present invention, the nonwoven web 12 may be a multilayer material having, for example, at least one layer of a spunbonded web joined to at least one layer of a meltblown web, a bonded carded web or other suitable material. Alternatively, the nonwoven web 12 may be a single layer of material such as, for example, a spunbonded web, a meltblown web, or a bonded carded web.

The nonwoven web 12 may also be a composite material made of a mixture of two or more different fibers or a mixture of fibers and particles. Such mixtures may be formed by adding fibers and/or particulates to the gas stream in which the meltblown fibers are carried so that an intimate entangled commingling of meltblown fibers and other materials, e.g., wood pulp, staple fibers and particulates such as, for example, hydrocolloidal (hydrogel) particles commonly referred to as superabsorbent materials, occurs prior to collection of the meltblown fibers upon a collecting device to form a coherent web of randomly dispersed meltblown fibers and other materials.

The nonwoven web of fibers should be joined by bonding to form a coherent web structure which is able to withstand necking. Suitable bonding techniques include, but are not limited to, chemical bonding, thermobonding, such as point calendering, hydroentangling, and needling.

Figure 5:
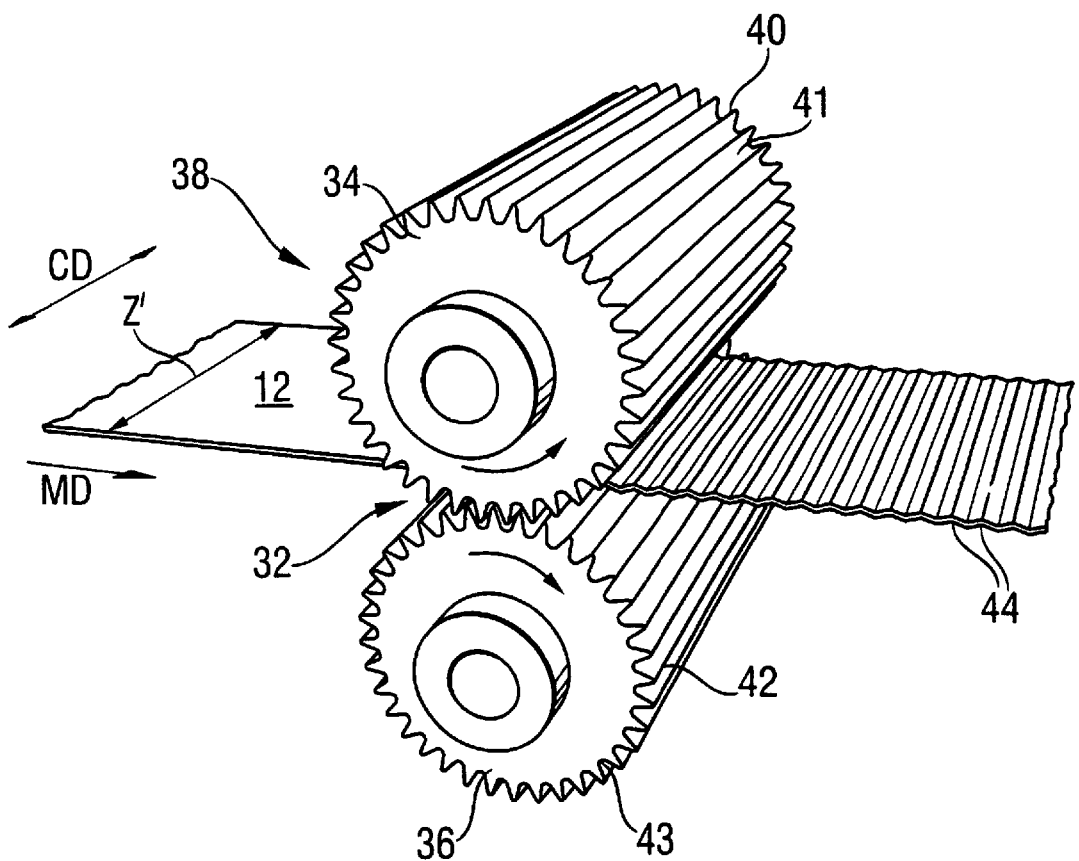
FIG. 5 is an enlarged perspective illustration of the stabilizing roller arrangement.

FIG. 5 is an enlarged perspective illustration of a preferred embodiment of the mechanical stabilization arrangement 38 employing opposed pressure applicators having three-dimensional surfaces which at least to a degree are complimentary to one another. The mechanical stabilization arrangement 38 shown in FIG. 5 comprises incremental stretching rollers 34 and 36. The nonwoven web 12 passes through the nip 32 formed by incremental stretching rollers 34 and 36 as the incremental stretching rollers rotate in the direction indicated by the arrows associated therewith. Uppermost incremental stretching roller 34 comprises a plurality of teeth 40 and corresponding grooves 41 which extend about the entire circumference of roller 34. Lowermost incremental stretching roller 36 to comprises a plurality of teeth 42 and corresponding grooves 43 which extend about the entire circumference of roller 36. The teeth 40 on roller 34 intermesh with or engage the grooves 43 on roller 36, while the teeth 42 on roller 36 intermesh with or engage the grooves 41 on roller 34.

The teeth 40 and 42 on rollers 34 and 36, respectively, extend in a direction substantially perpendicular to the first direction of the nonwoven web 12 or in a direction substantially parallel to the width of the nonwoven web 12. That is, teeth 40 and 42 extend in a direction parallel to the cross-machine or CD direction. The incremental stretching rollers 34 and 36 incrementally stretch the web in a direction generally perpendicular to the necked direction, i.e., in a direction parallel to the first direction, thereby stabilizing the nonwoven web 12 such that it remains in its bulked condition after passing through the incremental stretching rollers 34 and 36. By stabilizing the bulky nonwoven web, the nonwoven web substantially maintains its bulked condition.

After being stabilized by passing through the incremental stretching rollers 34 and 36, the stabilized nonwoven web 12 includes a plurality of stabilizing embossments 44. Stabilizing embossments 44 extend in a substantially linear direction parallel to one another across the entire width of the stabilized nonwoven web 12. The stabilizing embossments 44 are shown to be extending in a direction substantially parallel to the CD or cross-machine direction. As seen in FIG. 5, each stabilizing embossment extends across the stabilized nonwoven web 12 from one edge to the other edge. This is very important as this sets the fibers across the entire width of the web thereby stabilizing the web.

The incremental stretching rollers 34 and 36 may include any number of teeth and grooves to provide the desired stabilization in the nonwoven web. In addition, the teeth and grooves may be nonlinear, such as for example, curved, sinusoidal, zig-zag, etc. The size and amount of engagement of the teeth and grooves on the incremental stretching rollers 34 and 36 may be of any desired dimension. In addition, the teeth and grooves may extend in a direction other than perpendicular to the travel direction of the web. For example, the teeth and grooves may extend at an angle to the CD direction, but preferably not parallel to the MD or machine direction, as this type of incremental stretching would tend to expand the width of the web, thus defeating the purpose of the bulking operation.

Referring now to FIG. 1, after the nonwoven web 12 passes through the mechanical stabilization arrangement 38 it is wound up on take-up roll 50. Stabilizing the nonwoven web allows it to be wound up on a take-up roll and then later used for the desired end use. Once the nonwoven web has been stabilized or set, it is suitable for handling on high speed conventional diaper converting equipment without the need for special handling equipment. Alternatively, the nonwoven web 12 may be festooned into a box using conventional festooning equipment.

Conventional drive means and other conventional devices which may be utilized in conjunction with the apparatus of FIG. 1 are well known and, for purposes of clarity, have not been illustrated in the schematic view of FIG. 1.

Figure 6:
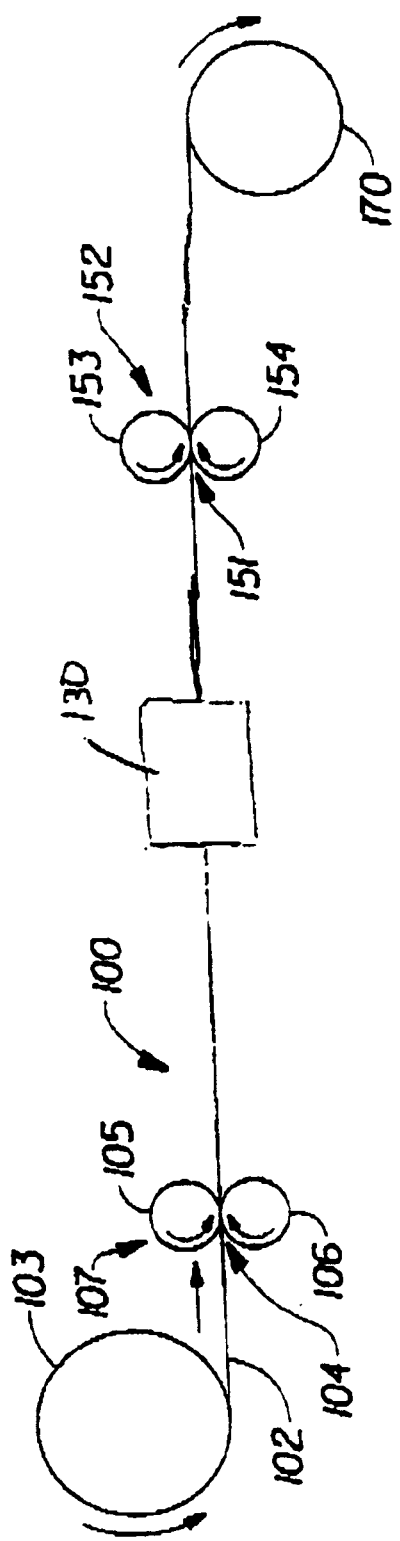
FIG. 6 is a schematic illustration of another exemplary process for forming a bulked nonwoven web of the present invention.

Referring now to FIG. 6, there is schematically illustrated another process 100 for forming a bulky nonwoven web of the present invention.

A nonwoven web 102 is unwound from a supply roll 103 and travels in the direction indicated by the arrows associated therewith, i.e., in the machine or first direction, as the supply roll 103 rotates in the direction indicated by the arrows associated therewith. From the supply roll 103 the nonwoven web 102 passes through the nip 104 formed by the incremental stretching rollers 105 and 106 of the cross-machine direction web enhancement arrangement 107. The cross-machine direction web enhancement arrangement 107 employs opposed pressure applicators having three-dimensional surfaces which at least to a degree are complimentary to one another. The cross-machine direction web enhancement arrangement 107 comprises incremental stretching rollers 105 and 106. A more detailed description of the cross-machine direction web enhancement arrangement comprising incremental stretching rollers is provided above and shown in FIG. 2.

Figure 7:
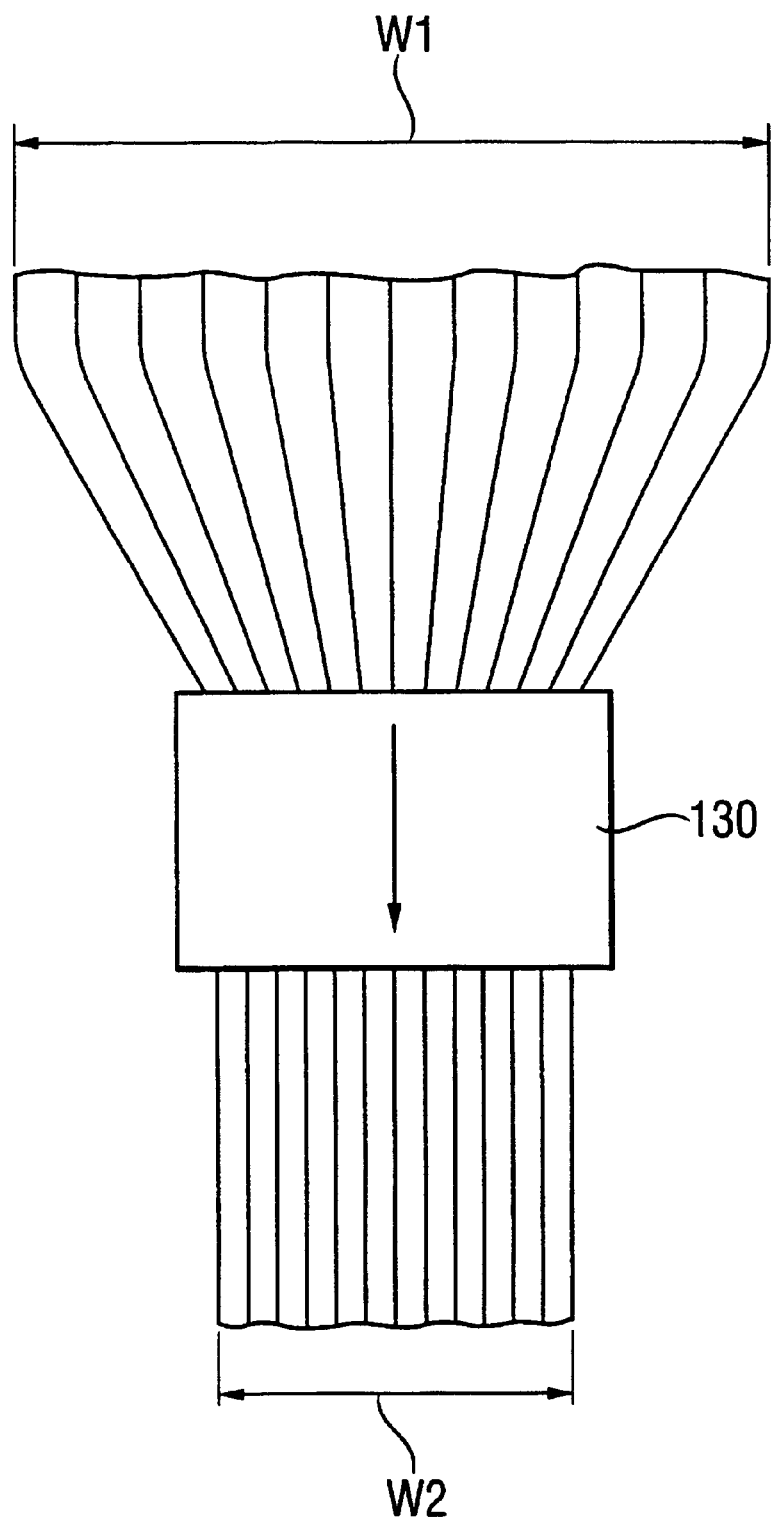
FIG. 7 is a schematic illustration of the web passing through the cross-directional web diverting device.

From the cross-machine direction web enhancement arrangement 107 the nonwoven web 102 passes through the cross-directional web diverting device 130 as shown in FIG. 7. The cross-directional web diverting device 130 gathers the web 102.

Figure 8:
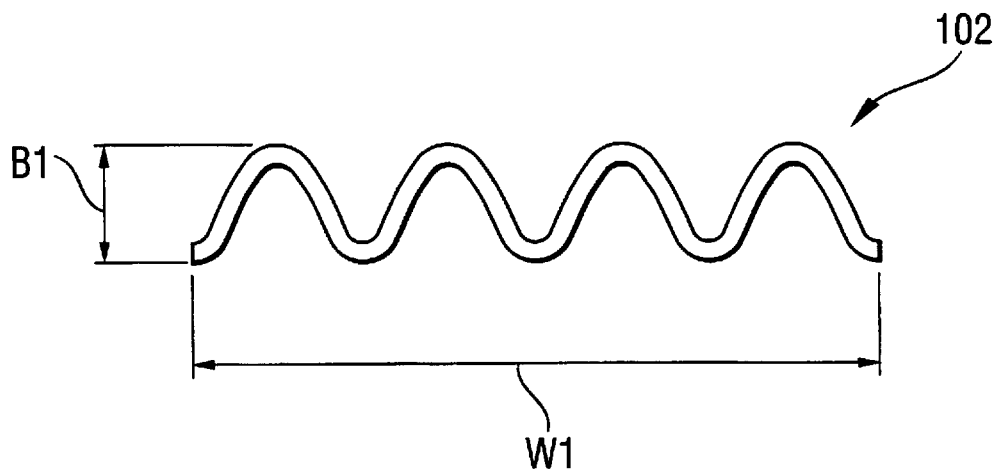
FIG. 8 is an illustration of a web which has been subjected to the cross-machine direction web enhancement arrangement and prior to entering the cross-directional web diverting device.
Figure 9:
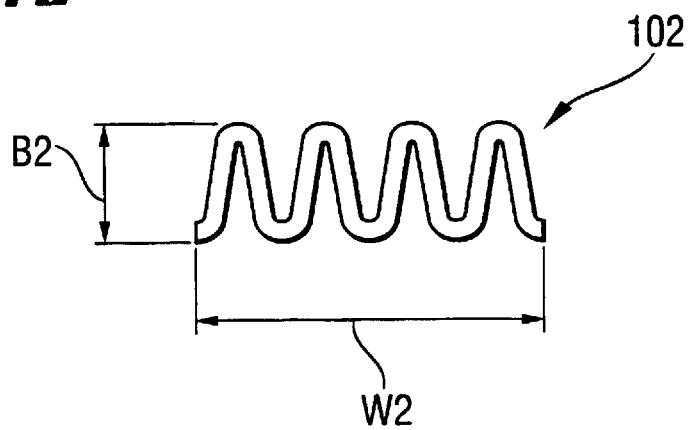
FIG. 9 is an illustration of a web which has been subjected to the cross-directional web diverting device.

In FIG. 8 there is illustrated a web 102 which has been subjected to the cross-machine direction web enhancement arrangement 107 and prior to entering the cross-directional web diverting device 130. Prior to entering the cross-directional web diverting device 130 the web 102 has a bulk dimension B1 and a width dimension W1. In FIG. 9 there is illustrated a web 102 which has been subjected to the cross-directional web diverting device 130. After being subjected to the cross-directional web diverting device 130 the web 102 has a bulk dimension B2 and a width dimension W2. Bulk dimension B2 is generally the same as bulk dimension B1 while width dimension W2 is less than width dimension W1. Width dimension W2 is preferably at least about 10% less than width dimension W1, more preferably at least about 20% less than width dimension W1, and most preferably at least about 30% less than width dimension W1. Width dimension W2 may be as much as about 50% less than dimension W1 or more.

Figure 10:
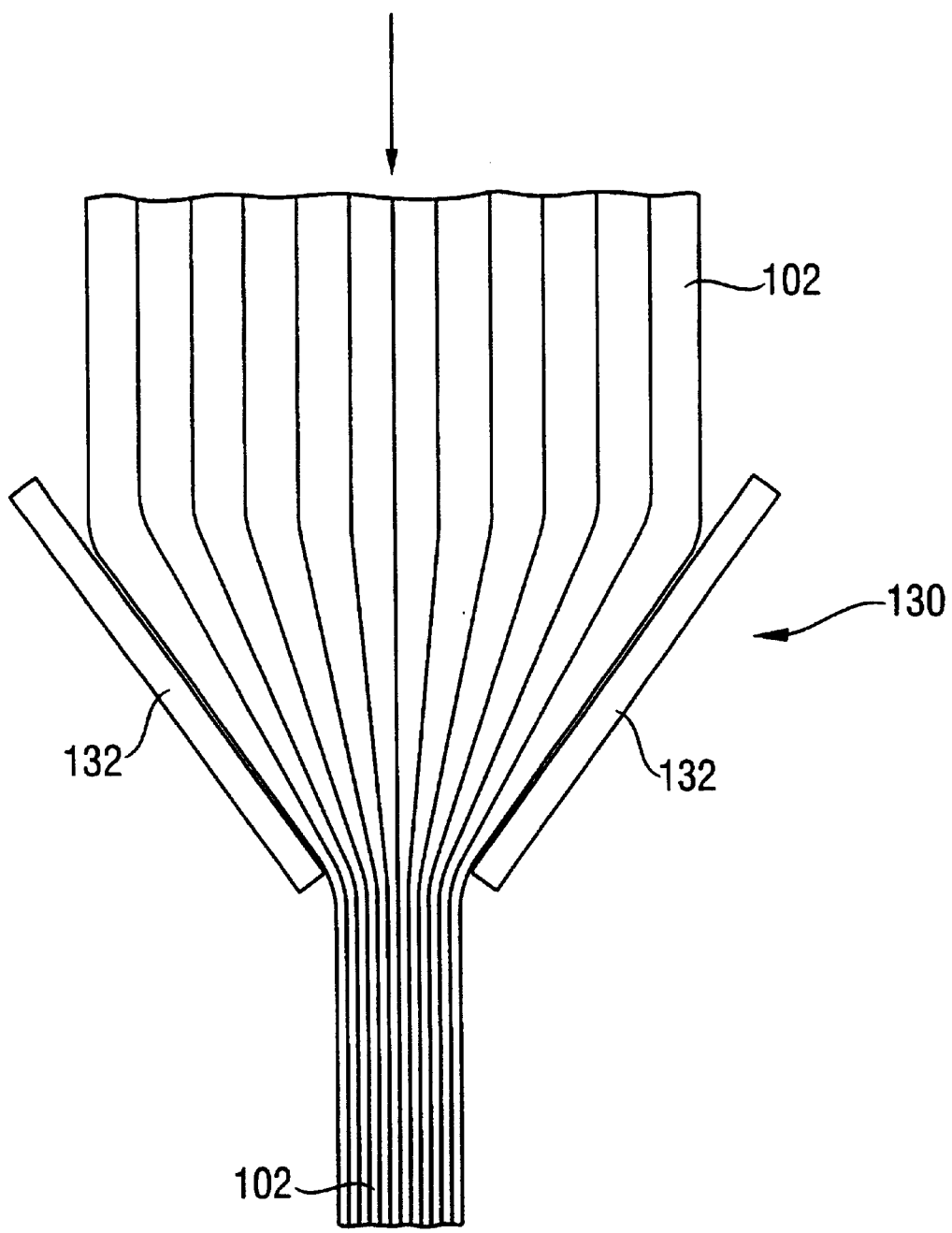
FIG. 10 is an illustration of a cross-directional web diverting device.

The cross-directional web diverting device 130 may be any device which gathers or compresses the web 102 such that its bulk dimension remains generally unchanged while the width dimension of the web is decreased. For example, as shown in FIG. 10, the cross-directional web diverting device 130 may comprise a pair of bars or arms 132 which are angled with respect to the machine direction such that the web 102 is gathered. Other potential devices for the cross-directional web diverting device 130 include but are not limited to tubes, plates, walls, rings, etc.

From the cross-directional web diverting device 130 the bulky nonwoven web 102 is stabilized or set. The bulky nonwoven web 102 may be stabilized mechanically, chemically, thermally, or by other techniques known in the art. The process illustrated in FIG. 6 shows the bulky nonwoven web being subjected to mechanical stabilization via the mechanical stabilization arrangement 152. A more detailed description of the mechanical stabilization arrangement is provided above and shown in FIG. 5.

In order to provide chemical stabilization, the mechanical stabilization arrangement 152 is replaced with an apparatus, such as a spray head, to apply a chemical agent to the nonwoven web 102. Any conventional equipment known in the art for applying chemical agents to moving webs may be used. In order to provide thermal stabilization, the mechanical stabilization arrangement 152 is replaced with an apparatus, such as an oven, to apply a heat the nonwoven web 102. Any conventional equipment known in the art for heating moving webs may be used.

After leaving mechanical stabilization arrangement 152 the stabilized bulked nonwoven web 102 is wound up on take-up roll 160. Alternatively, the stabilized bulked nonwoven web 102 may be festooned into a box using conventional equipment.

Conventional drive means and other conventional devices which may be utilized in conjunction with the apparatus of FIG. 6 are well known and, for purposes of clarity, have not been illustrated in the schematic view of FIG. 6.

Test Methods

Surface-pathlength measurements of nonwoven webs are to be determined by analyzing the nonwoven webs by means of microscopic image analysis methods.

The sample to be measured is cut and separated from nonwoven web. An unstrained sample length of one-half inch is to be "gauge marked" perpendicular to the "measured edge" while attached to the web, and then accurately cut and removed from the web.

Measurement samples are then mounted onto the long-edge of a microscopic glass slide. The "measured edge" is to extend slightly (approximately 1 mm) outward from the slide edge. A thin layer of pressure-sensitive adhesive is applied to the glass face-edge to provide a suitable sample support means. For a sample having deep rugosities it may be necessary to gently extend the sample (without imposing significant force) to facilitate contact and attachment of the sample to the slide edge. This allows improved edge identification during image analysis and avoids possible "crumpled" edge portions that require additional interpretation analysis.

Images of each sample are to be obtained as "measured edge" views taken with the support slide "edge on" using suitable microscopic measuring means of sufficient quality and magnification. Data is obtained using the following equipment; Keyence VH-6100 (20× Lens) video unit, with video-image prints made with a Sony Video printer Mavigraph unit. Video prints are image-scanned with a Hewlett Packard ScanJet IIP scanner. Image analysis is on a MacIntosh IICi computer utilizing the software NIH MAC Image version 1.45.

Using this equipment, a calibration image initially taken of a grid scale length of 0.500" with 0.005" increment-marks to be used for calibration setting of the computer image analysis program. All samples to be measured are then video-imaged and video-image printed. Next, all video-prints are image-scanned at 100 dpi (256-level gray scale) into a suitable Mac image-file format. Finally, each image-file (including calibration file) is analyzed utilizing Mac Image 1.45 computer program. All samples are measured with freehand line-measurement tool selected. Samples are measured on both side-edges and the lengths are recorded. Thin samples require only one side-edge to be measured. Thick samples are measured on both side-edges. Length measurement tracings are to be made along the full gauge length of a cut sample. In some cases multiple (partially overlapping) images may be required to cover the entire cut sample. In these cases, select characteristic features common to both overlapping-images and utilize as "markers" to permit image length readings to adjoin but not overlap.

The final determination of surface-pathlength is obtained by averaging the lengths of five (5) separate ½" gauge-samples of each region. Each gauge-sample "surface-pathlength" is to be the average of both side-edge surface-pathlengths.

While the test method described above is useful for many of the webs of the present invention it is recognized that the test method may have to be modified to accommodate some webs.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of producing a bulked web comprising the steps of:
   a) providing a web;
   b) feeding the web in a first direction;
   c) subjecting the web to incremental stretching in a direction perpendicular to said first direction to provide a bulky web;
   d) gathering the bulky web wherein the bulky web has a first bulk dimension before gathering and a second bulk dimension after gathering, the bulk dimensions being substantially equal; and
   e) stabilizing the bulky web to provide a stabilized bulked web.

2. The method of claim 1 wherein said gathering the bulky web comprises feeding the web through a cross-directional web diverting device.

3. The method of claim 1 wherein said stabilization comprises subjecting the web to an elevated temperature to thermally set the web.

4. The method of claim 1 wherein said stabilization comprises applying a chemical substance to the web to chemically set the web.

5. The method of claim 1 further comprising the additional step of:
   f) winding the stabilized bulked web onto a take-up roll.

6. The method of claim 1 further comprising the additional step of:
   f) festooning the stabilized bulked web into a box.

7. The method of claim 1 wherein said stabilization comprises feeding the web through a nip formed by a pair of patterned compression rollers.

8. The method of claim 7 wherein said patterned compression rollers provide a continuous compression stabilization embossment across the entire width of the web.

9. The method of claim 1 wherein step c) comprises subjecting the web to incremental stretching in a direction parallel to said first direction.

10. The method of claim 9 wherein said incremental stretching comprises feeding the web through a nip formed by a pair of incremental stretching rollers.

11. The method of claim 10 wherein each said incremental stretching roller comprises a plurality of teeth and a plurality of grooves.

12. The method of claim 1 wherein said web is a nonwoven web selected from the group consisting of a bonded carded web of fibers, a web of spunbonded fibers, a web of meltblown fibers, and a multilayer material including at least one of said webs.

13. The method of claim 12 wherein said fibers comprise a polymer selected from the group consisting of polyolefins, polyesters, and polyamides.

14. The method of claim 13 wherein said polyolefin is selected from the group consisting of one or more of polyethylene, polypropylene, polybutene, ethylene copolymers, propylene copolymers, and butene copolymers.

15. The method of claim 14 wherein said web is a composite material comprising a mixture of fibers and one or more other materials selected from the group consisting of wood pulp, staple fibers, particulates, and super-absorbent materials.

* * * * *

UNITED STATES PATENT AND TRADEMARK OFFICE
CERTIFICATE OF CORRECTION

PATENT NO. : 6,726,870 B1
DATED : April 27, 2004
INVENTOR(S) : Douglas Herrin Benson et al.

It is certified that error appears in the above-identified patent and that said Letters Patent is hereby corrected as shown below:

<u>Title page,</u>
Item [57], ABSTRACT,
Line 5, delete "web," and insert -- web. --.

<u>Column 1,</u>
Line 17, delete "garments" and insert -- garments, --.

<u>Column 10,</u>
Line 7, delete "wherein step c)" and insert -- wherein step e) --.

Signed and Sealed this

Seventh Day of March, 2006

JON W. DUDAS
*Director of the United States Patent and Trademark Office*